United States Patent
Reynolds

(10) Patent No.: US 7,260,200 B1
(45) Date of Patent: Aug. 21, 2007

(54) ENABLING INTERRUPTION OF COMMUNICATIONS AND DETECTION OF POTENTIAL RESPONSES TO AN INTERRUPTION OF COMMUNICATIONS

(75) Inventor: Richard Reynolds, Sterling, VA (US)

(73) Assignee: AOL LLC, a Delaware Limited Liability Company, Dulles, VA (US)

(*) Notice: Subject to any disclaimer, the term of this patent is extended or adjusted under 35 U.S.C. 154(b) by 846 days.

(21) Appl. No.: 10/231,196

(22) Filed: Aug. 30, 2002

(51) Int. Cl.
*H04M 3/42* (2006.01)

(52) U.S. Cl. .................... 379/207.02; 379/207.03; 379/210.02

(58) Field of Classification Search .............. 379/201.1, 379/201.02, 201.03, 201.05, 207.02, 207.03, 379/210.02, 211.01, 211.02
See application file for complete search history.

(56) References Cited

U.S. PATENT DOCUMENTS

| | | | |
|---|---|---|---|
| 5,329,578 A * | 7/1994 | Brennan et al. | 379/211.03 |
| 5,467,388 A * | 11/1995 | Redd et al. | 379/210.02 |
| 5,572,667 A | 11/1996 | Ideta | |
| 5,734,709 A * | 3/1998 | DeWitt et al. | 379/221.15 |
| 6,310,946 B1 * | 10/2001 | Bauer et al. | 379/208.01 |
| 6,366,661 B1 * | 4/2002 | Devillier et al. | 379/211.01 |
| 6,599,139 B1 * | 7/2003 | Hunter | 439/133 |
| 6,671,357 B1 * | 12/2003 | Roberts, Jr. | 379/93.02 |

FOREIGN PATENT DOCUMENTS

| | | |
|---|---|---|
| EP | 0 942 374 | 3/1999 |
| JP | 1-190133 | 7/1989 |
| JP | 7-200343 | 8/1995 |
| WO | 01/27873 | 4/2001 |

* cited by examiner

*Primary Examiner*—Bing Q. Bui
(74) *Attorney, Agent, or Firm*—Fish & Richardson P.C.

(57) ABSTRACT

A system to enable detection of a response of a communications system to timed interruption of communications includes a computer that transmits and receives signals using at least one communication path and a device that disables the communications path based on a control signal. The control signal instructs an intended interruption in communications in the communications path.

84 Claims, 8 Drawing Sheets

```
                                                       sample script.txt
         700
            display,Test
   705    clear cache
         dtr_init,COM1
        sleep,10
 710             dtr_raise ──720
     715       sleep,5 ──725 start client ──730

735 ──sleep,5
                find,sign on ──740
                                 ──745   750
                text,4,password
                sign on quick,120
  755      ──sleep,20
              close all,2 ──760 dtr_timer,15000 ──765

770   ──kw,60,http://www.any_web_site.com,World Wide Web
            ──wait stop disabled,20
  775
             sleep,30 ──780 sign off,120 ──785
             sleep,15 ──790 dtr_close
  795
```

Fig. 7

ENABLING INTERRUPTION OF COMMUNICATIONS AND DETECTION OF POTENTIAL RESPONSES TO AN INTERRUPTION OF COMMUNICATIONS

TECHNICAL FIELD

The following description relates generally to data communications across a network, and more particularly to the development and testing of communications software through the use of a system capable of interrupting data communications at specified times.

BACKGROUND

Communications software used to establish or leverage data exchanges with network devices may include diagnostics for identifying, diagnosing, or recommending solutions for interruptions of network communications. For example, if an unexpected communications error occurs, communications software may include diagnostics to assess the cause of the communications error. To add value, such diagnostics may be configured to accurately detect the source of the communications error.

One factor that may be used to distinguish communication errors is their timing relative to other events or processes. For example, diagnostic software may be configured to select a disconnect error from a library of possible disconnect errors based in whole or in part on the relative timing of a detected communication interruption.

Testing may be performed to develop and/or refine relationships between the timing of communication errors to their causes. One method of testing involves manually interrupting communications by, for example physically disconnecting two communicating devices. To enable testing with this approach, it is necessary to record the timing of the manually-introduced disconnection. Furthermore, to enable diagnosis of an increased number of distinct communication errors based on timing or simply to improve the accuracy of relationships between detected timing and potential errors, an increased sensitivity to timing may be desirable during testing and development.

SUMMARY

In one general aspect, an apparatus to invoke an intended interruption of communications includes a first communications port that enables communications with a first communication device, a second communications port that enables communications with a second communication device, a third communications port that enables receipt of a control signal, and circuitry that intentionally disables a communication path between the first communications port and the second communications port based on a value of the control signal.

Implementations may include one or more of the following features. For example, the circuitry may include manual switches to manually enable or disable the communications path and may enable the communications path based on the value of the control signal. The apparatus may further include a fourth communications port that enables communications of timing data to the first communication device to relate timing information with respect to when the communications path is enabled or disabled.

The first communications port and the third communications port may be physically distinct ports. Alternatively, they may be provided by a single physical port.

The apparatus may further include a timing processor that generates the control signal and provides the control signal to the third communications port. The timing processor may receive a timing signal and generate the control signal based on the timing signal. The timing processor also may receive the timing signal as an interruption request from a computer. The interruption request may be based on communications involving a program that uses or establishes the communications path.

The computer may include the first communication device. Alternatively, the computer and the first communication device may be distinct.

The interruption request may instruct interruption at a predetermined time relative to a communication event involving the program. The interruption request may include a start and stop.

The communications path may include a receive communications path that is disabled based on the timed control signal. The communications path may include a transmit communications path that is disabled based on the timed control signal.

The timing processor may present a manual user interface to enable input of a start time and a stop time and may generate the control signal based on the start time and the stop time.

In another general aspect, a system to enable detection of a response of a communications system to timed interruption of communications includes a computer that transmits and receives signals using at least one communication path and a device that disables the communications path based on a control signal. The control signal instructs an intended interruption in communications on the communications path.

In another general aspect, enabling detection of a potential response to an interruption of communications includes determining an error code appropriate for the scheduled interruption and determining whether the error code generated is accurate based on a comparison involving the error code generated and the error code determined as appropriate.

Other features will be apparent from the description, the drawings, and the claims.

DESCRIPTION OF DRAWINGS

FIG. 7 is an exemplary script that may be used by automation software to communicate with the interrupter device of FIGS. 5 and 6.

DETAILED DESCRIPTION

Figure 1A:
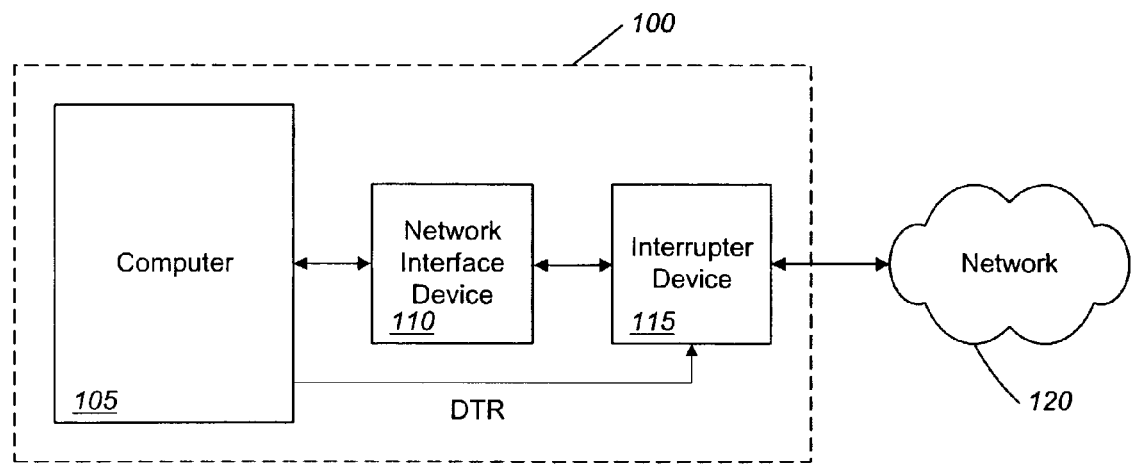
FIGS. 1A and 1B are block diagrams of exemplary communications systems that each include an interrupter device.

FIG. 1A shows a communications system 100 that includes a computer 105, a network interface device 110, and an interrupter device 115. The communication system 100 may communicate with other communication systems of similar or different type or configuration using a network 120. Alternatively, the communication system 100 may communicate with another device (not shown) directly rather than through the network 120.

The computer 105 may be implemented using a processor, a programmable logic device, a digital signal processor, an application-specific integrated circuit, or any other device that may execute program instructions. The computer 105 may include a number of other components, such as, for example, displays, memory/storage devices, input devices, interfaces, printers, and speakers. The computer 105 may implement communications software (e.g., a client software program) that communicates with other computer systems by exchanging data with the network 120.

The network interface device 110 handles the exchange of communications data between the computer 105 and the network 120. The network interface device 110 may include an Ethernet device, a communications card, an analog or dial-up modem, a wireless modem, a digital subscriber line modem, a bidirectional cable or satellite communications device, and a unidirectional cable or satellite communications device with a return signal path (e.g., phone line). The network interface device 110 may be internal or external to the computer 105.

As shown in FIG. 1A, the communications data passes through an interrupter device 115 prior to reaching the network 120. The interrupter device 115 may be used to test the response of the client software program to an interruption of communications between the computer 105 and the network 120.

The interrupter device 115 may be implemented using a hardware device that enables or disables communications between the computer 105 and the network 120. The interrupter device 115 may be placed between the network interface device 110 and the network 120, and may be internal or external to the computer 105. The interrupter device 115 also may be configured to accept data from more than one computer 105 and to interrupt the communication paths between the computer(s) and the network 120. For example, a communications path may be added for each additional computer 105 connected to the interrupter device. As an alternative, switching and/or multiplexing may be used to share communications paths with more than one computer 105.

The computer 105 may send a signal to the interrupter device 115 to establish or cut-off the communication path between the computer 105 and the network 120. The signal may be a data transmission (DTR) signal that establishes the communication path (e.g., when set to a high voltage) and cuts-off the communication path (e.g., when set to a low voltage). The DTR signal may be kept at a high potential during normal data communications and may be dropped to a low potential to cutoff the communications at a time determined by the computer 105 (or by another device not shown). Operation of the DTR and the interrupter device 115 are described in further detail below.

Using the computer 105 to generate the DTR signal allows the DTR signal to interrupt communications in response to or during a specific process performed by the client software program (e.g., downloading a web page, uploading password data to a remote computer system, or uploading or downloading e-mail data). Because it may be difficult to predict when a specific process is performed, incorporating the timing processor function in the computer 105 facilitates triggering the DTR signal based on the specific process rather than on an absolute time.

The network 120 may be a local area network (LAN), a metropolitan area network (MAN), a wide area network (WAN), or a combination of one or more of these networks.

Figure 1B:
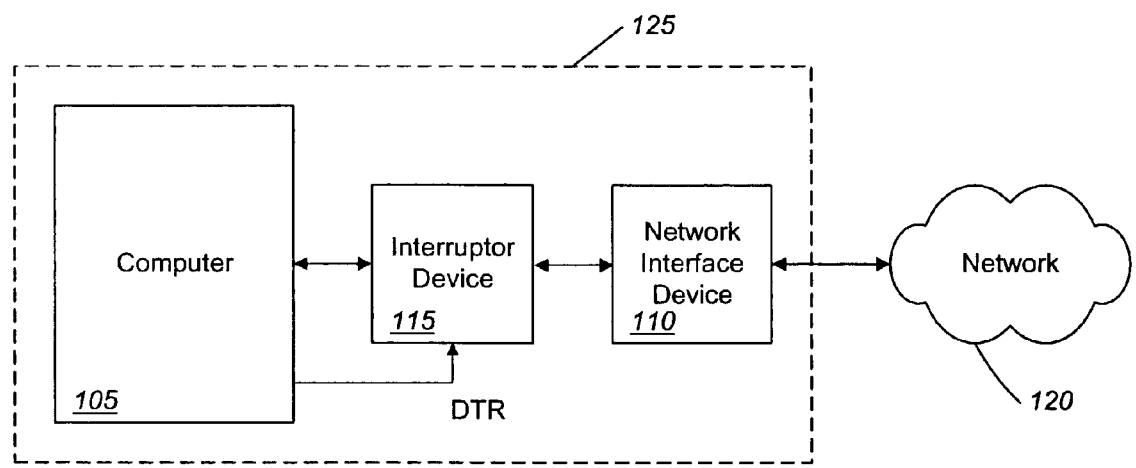

FIG. 1B shows a system 125 that is configured differently from the system 100 of FIG. 1A. Like the system 100, the system 125 includes a computer 105, a network device 110, and an interrupter device 115. The system 125 differs in that the interrupter device 115 is placed between the computer 105 and the network interface device 110.

Figure 2A:
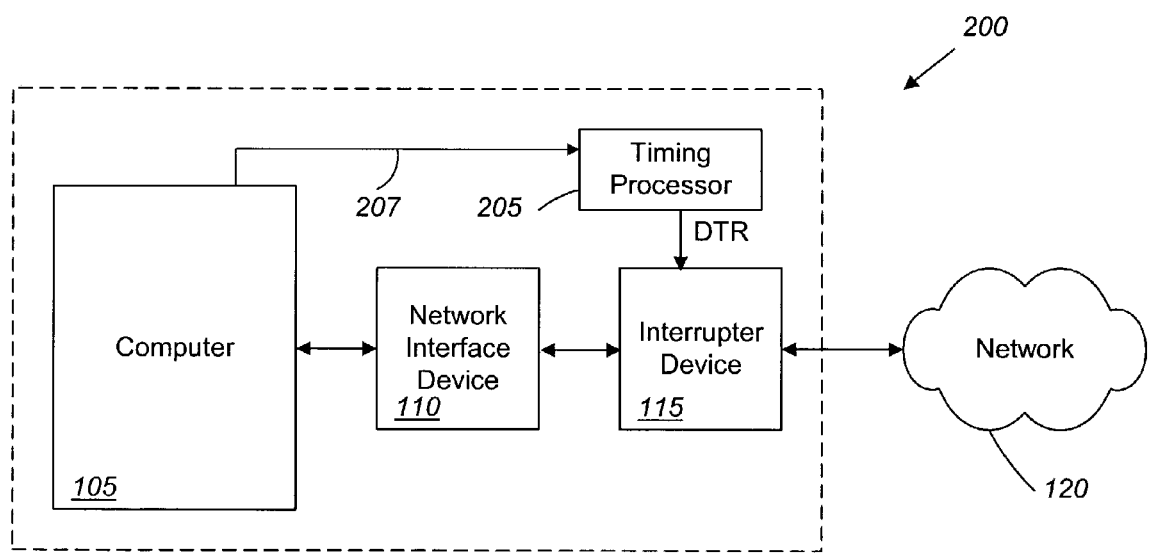
FIGS. 2A and 2B are block diagrams of exemplary communications systems similar to those of FIGS. 1A and 1B but including an additional timing processor (FIG. 2A) or computer (FIG. 2B).

FIG. 2A shows a communications system 200 that includes a computer 105, a network interface device 110, an interrupter device 115, and a timing processor 205. The timing processor 205 may be internal to or external from the interrupter device 115.

The timing processor 205 may be used to generate a DTR signal. In particular, the computer 105 may send to the timing processor 205 an interruption request or timing signal 207 that is triggered at a specified time or based on a predetermined event. For ease of discussion, the term timing signal 207 is used throughout the following discussion to refer to a timing signal or an interruption request. The timing signal 207 may specify a timer start time and a timer stop time, or other signals, that are used by the timing processor 205 to determine when/whether to generate a signal (e.g., a DTR signal) that enables or disables the communication path.

A manual timing processor (not shown) may be used to allow a user to manually input start and stop times (without need for a signal 207 from the computer 105). The manual timing processor may be incorporated in the interrupter device 115 (or located externally).

The timing processor 205 does not use the processing cycles of the computer 105 to keep track of time and to send the DTR signal when appropriate (i.e., at a predetermined absolute time). As a result, the processing cycles of computer 105 may be uninhibited and unencumbered by the interruption device 115 or the interruption process, which leaves the processing cycles of the computer 105 available to run the client software program having the associated communication pathway that is to be interrupted by the interrupter device 115. As a result, the timing processor 205 limits the effect of running a test simulation on the execution of the client software program, and, accordingly, reduces the likelihood that the test results will be rendered inconclusive due to the Heisenberg principle.

A second computer (not shown) also may send a timing signal 207 to the timing processor 205. The second computer which also may operate as the timing processor 205, may be implemented in a manner similar to computer 105 and may be located in a remote location (i.e., physically separated from the computer 105).

Figure 2B:
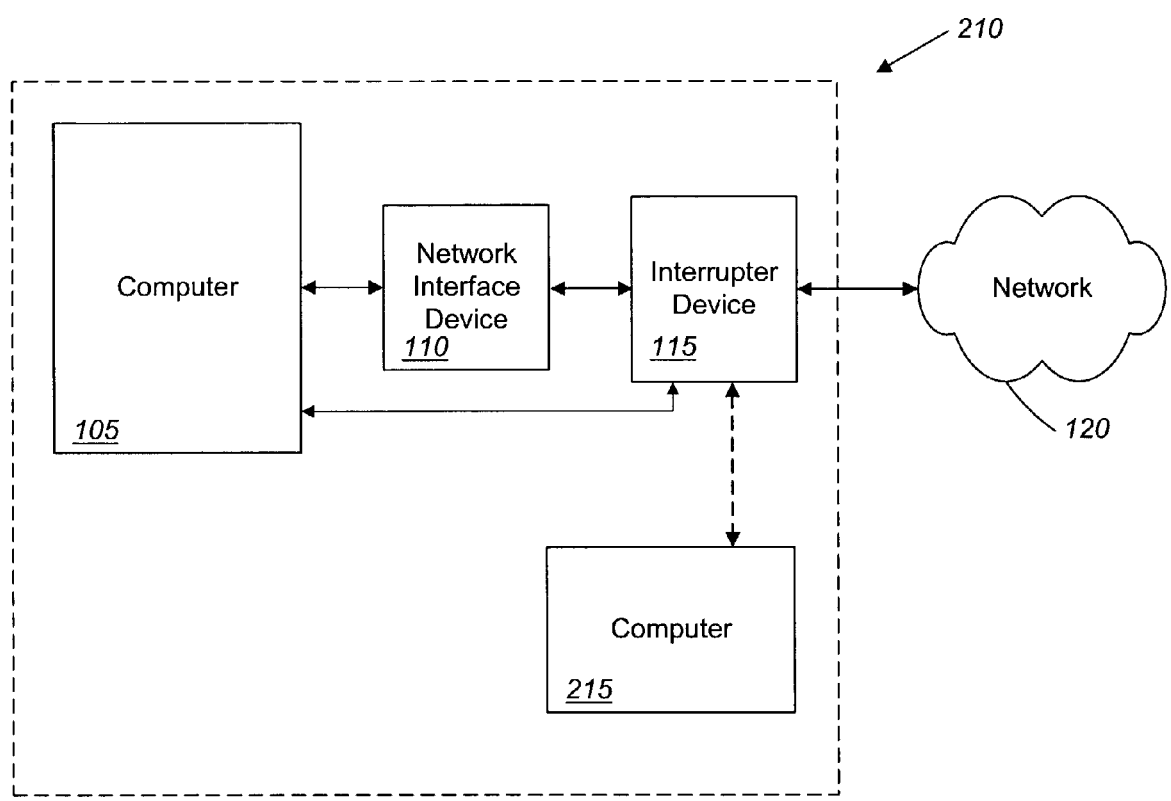

FIG. 2B shows a communications system 210 that includes a computer 105, a network interface device 110, an interrupter device 115, and a second computer 215. The second computer 215 may be implemented in a manner similar to computer 105. The second computer 215 may be located, for example, in a remote location (i.e., physically separated from the computer 105). In this configuration, the interrupter device 115 may report the timing of the interruption to the computer 105 and/or to the second computer 215. If the interrupter device 115 reports the timing of the interruption to the second computer 215, a diagnosis of any error associated with the interruption may be determined by the second computer 215. The timing data may be used by the computer 105 and/or the computer 215 to determine what error code should have been generated in response to the interruption and to compare that error code to the error code actually generated by the client software program of the computer 105. A difference in the error codes suggests the error code generated by the client software program was not generated accurately.

The implementation illustrated in FIG. 2B is useful when an interruption is triggered by a process performed by the client software program. Because it may be difficult to predict when a specific process is performed, incorporating the timing processor function into the computer 105 facilitates triggering the DTR signal based on the specific process rather than an absolute time.

Figure 3:
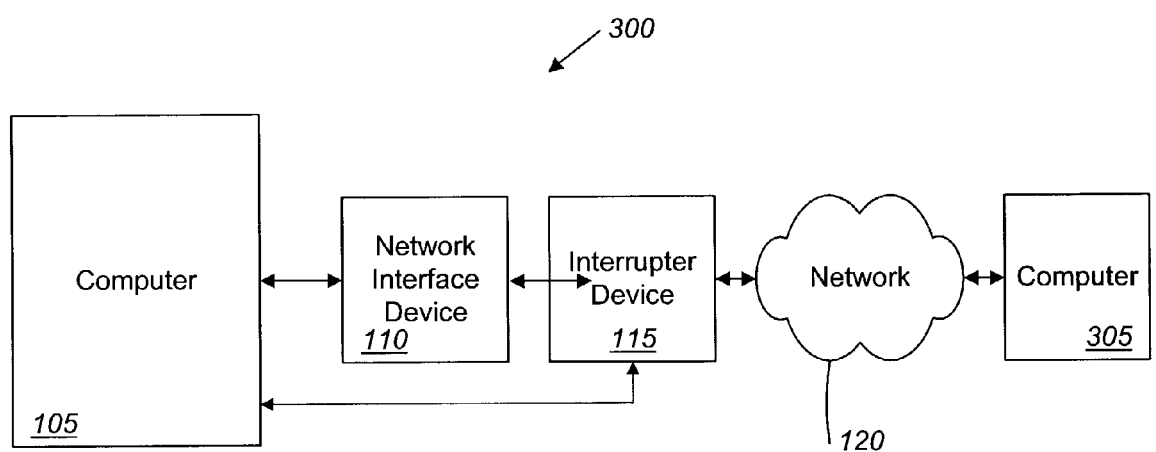
FIG. 3 is a block diagram of an exemplary communications system that includes an interrupter device.

FIG. 3 shows a communications system 300 that includes a computer 105, a network interface device 110, an interrupter device 115, a network 120, and a second computer 305. The second computer 305 is a remote computer that uses the network 120 to communicate with the computer 105. The second computer 305 may execute a host software program. In order to test the response of the host software program to interruptions of communications, the second computer 305 may negotiate the timing of a connection failure with the computer 105. Once the negotiation is complete, the computer 105 enables an interruption in communications with the computer 305 at the agreed-upon time or upon occurrence of an agreed upon event or condition using the interrupter device 115 alone, as shown, or in a configuration such as shown in FIGS. 1B-2B.

Figure 4:
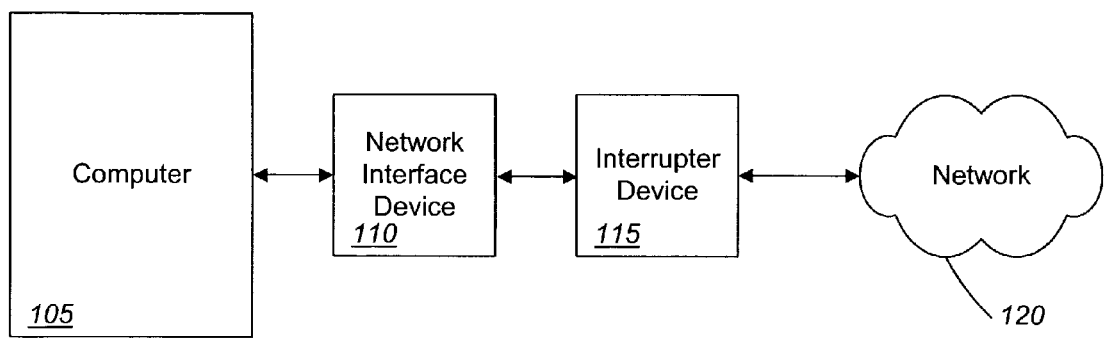
FIG. 4 is a block diagram of an exemplary communications system that includes an interrupter device.

As shown in FIG. 4, the interrupter device 115 may be configured to operate without any signal from the computer 105. Instead, the interrupter device 115 may include manual bypass switches to manually enable or disable the communications path to network 120. The communications path may include both a transmit (TX) path and a receive (RX) path for a network interface device 110 (e.g., a transmit path and a receive path are used in bidirectional cable, satellite communication, and Ethernet devices). The manual bypass switches may be manually toggled to enable or disable the TX path, the RX path, or both paths to the network 120. The manual bypass switches may be integrated in, or electrically connected to, the interrupter device 115. The manual bypass switches are described in further detail below.

Figure 5:
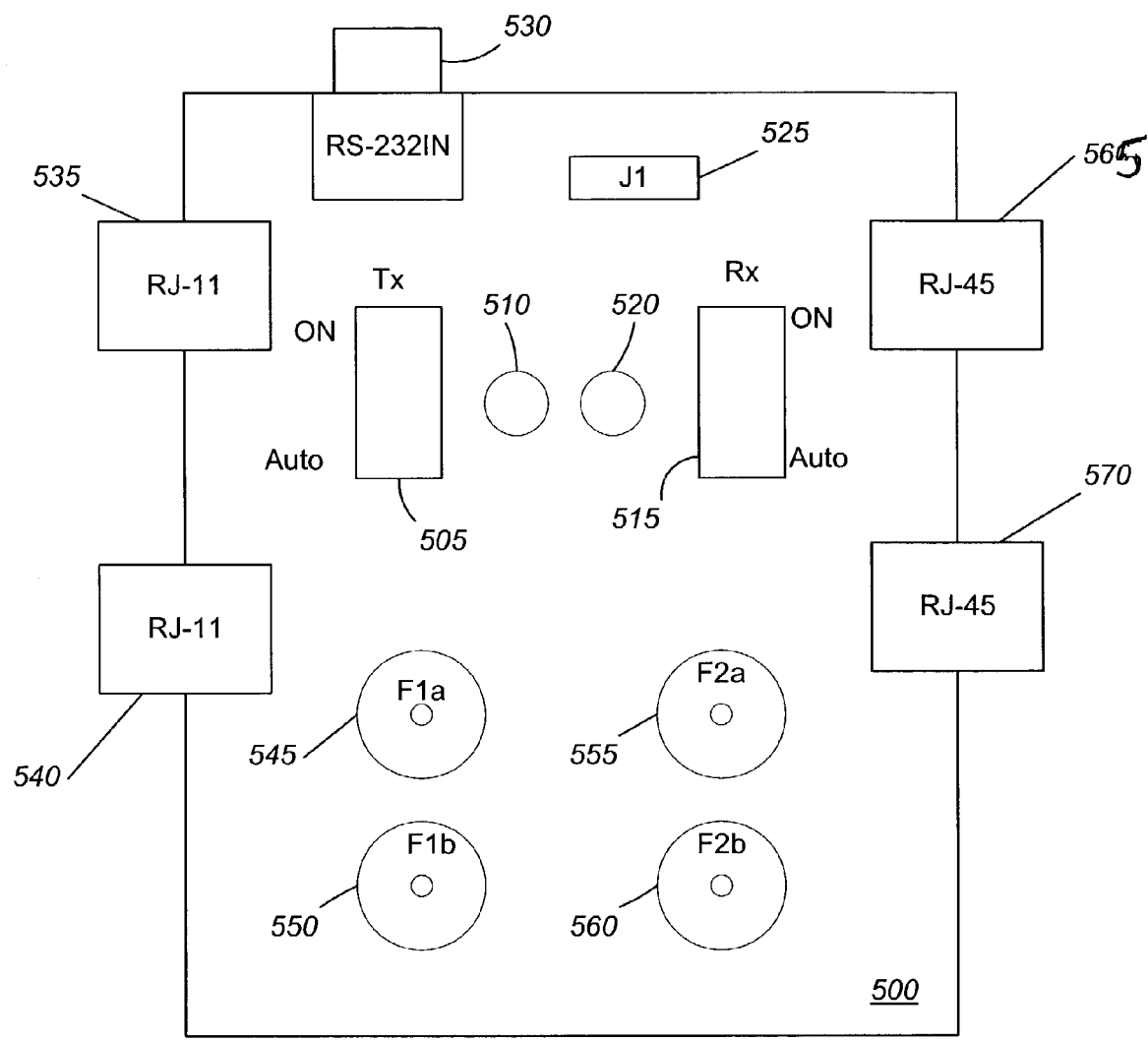
FIG. 5 is a block diagram of the interrupter device of FIG. 4.

As shown in FIG. 5, the interrupter device 115 may include a housing 500 with various attached connectors, a TX manual bypass switch 505, a TX light emitting diode (LED) 510, a RX manual bypass switch 515, and a RX LED 520. The various attached connectors may include a power connector 525, a serial input connector 530, a phone line input connector 535, a phone line output connector 540, a satellite or cable TX input 545, a satellite or cable TX output 550, a satellite or cable RX input 555, a satellite or cable RX output 560, an Ethernet input 565, and an Ethernet output 570. The interrupter device 115 may include fewer or more connectors than shown in FIG. 5, including different types of connectors, as determined, for example, by a particular system for which interruptions and testing are performed.

The interrupter device 115 described above may include any or several TX communication paths and/or RX communication paths. Specifically, for example, the TX communication path may connect the phone line input connector 535 to the phone line output connector 540, the satellite or cable TX input connector 545 to the satellite or cable TX output connector 550, and the Ethernet TX input pin (i.e., one of the pins of the Ethernet input connector 565) to the Ethernet TX output pin (i.e., one of the pins of the Ethernet output connector 570). Similarly, the RX communication path may connect the satellite or cable RX input connector 555 to the satellite or cable RX output connector 560, and the Ethernet RX input pin (i.e., one of the pins of the Ethernet input connector 565) to the Ethernet RX output pin (i.e., one of the pins of the Ethernet output connector 570). The TX LED 510 indicates when the TX communication path is enabled. Similarly, the RX LED 520 indicates when the RX communication path is enabled.

The TX manual bypass switch 505 and the RX manual bypass switch 515 each have an ON position and an AUTO position. The interrupter device 115 may be set to an automatic mode by setting the TX manual bypass switch 505 and the RX manual bypass switch 515 to the AUTO position. When operating in the automatic mode, the interrupter device 115 receives power from an external power source using the power connector 525 and may receive a DTR signal from the computer 105 (or timing processor 205) using the serial input connector 530. When the DTR signal enables communication (e.g., DTR is set to a high voltage), the communication paths between the input and output data communication connectors are enabled. When the DTR signal disables communication (e.g., is set to a low voltage), the communication paths between the input and output data communication connectors are severed.

The interrupter device 115 also may be set to a bypass mode by setting the TX manual bypass switch 505 to ON, or setting the RX manual bypass switch 515 to ON, or setting both switches 505 and 515 to ON. When operating in the bypass mode, the interrupter device 115 receives power from an external power source using the power connector 525 and receives a DTR signal from the computer 105 (or, e.g., a timing processor 205, or a computer 215/305) using the input connector 530.

When the TX manual bypass switch 505 is set to ON and the RX manual bypass switch 515 is set to AUTO, the RX communication path is disabled when the DTR signal is disabled (e.g., dropped to a low value) while, the TX communication path remains enabled. In this example, the TX communication path is enabled regardless of the value of the DTR signal (i.e., the DTR signal is bypassed with respect to the TX communication path). Setting the TX bypass switch 505 to ON and the RX manual switch 515 to AUTO may be used to test the effects of interrupting one direction of a bidirectional communications connection (e.g., the client software is able to upload data to the network 120 but is not able to download data from the network 120).

When the RX manual bypass switch 515 is set to ON and the TX manual bypass switch 505 is set to AUTO, the TX communication path is disabled when the DTR signal is disabled (e.g., dropped to a low value). In this example, the RX communication path is enabled regardless of the value of the DTR signal (i.e., the DTR signal is bypassed with respect to the RX communication path). Setting the RX manual bypass switch 515 to ON and the TX manual bypass switch 505 to AUTO may be used to test the effects of interrupting a bidirectional communications connection (e.g., the client software is able to download data from the network 120 but is not able to upload acknowledgement data to the network 120).

When the TX manual bypass switch 505 is set to ON and the RX manual bypass switch 515 is set to ON, both the TX communication paths and the RX communication paths are connected and enabled regardless of the value of the DTR signal.

The interrupter device 115 may be set to a manual mode by disabling the DTR signal from the computer 105 (e.g., dropping DTR to a low value) or disconnecting the serial connection to the computer 105. When this is done, the manual bypass switches may be used to enable or disable the communication paths. In particular, when configured to manual mode as indicated above, a bypass switch (i.e., 505 or 515) set to AUTO disables an associated communications path (i.e., Tx or Rx) while a bypass switch set to ON enables an associated communications path. Thus, four permutations exist. When both bypass switches 505 and 515 are set to ON, the communication paths between all input and output data communication connectors are enabled. When both bypass switches 505 and 515 are set to AUTO, the communication paths between all input and output data communication connectors are disabled. When the TX bypass switch 505 is set to ON and the RX bypass switch 515 is set to AUTO, the TX communication path is enabled, and the RX communication path is disabled. Similarly, when the TX bypass switch 505 is set to AUTO and the RX bypass switch 515 is set to ON, the RX communication path is enabled, and the TX communication path is disabled. Therefore, the user may manually enable or disable all communication paths, the RX communication path, or the TX communication path by setting one or both of the manual bypass switches 505 and 515.

The interrupter device 115 may be disconnected from the external power source when operating in the manual mode.

Figure 6:
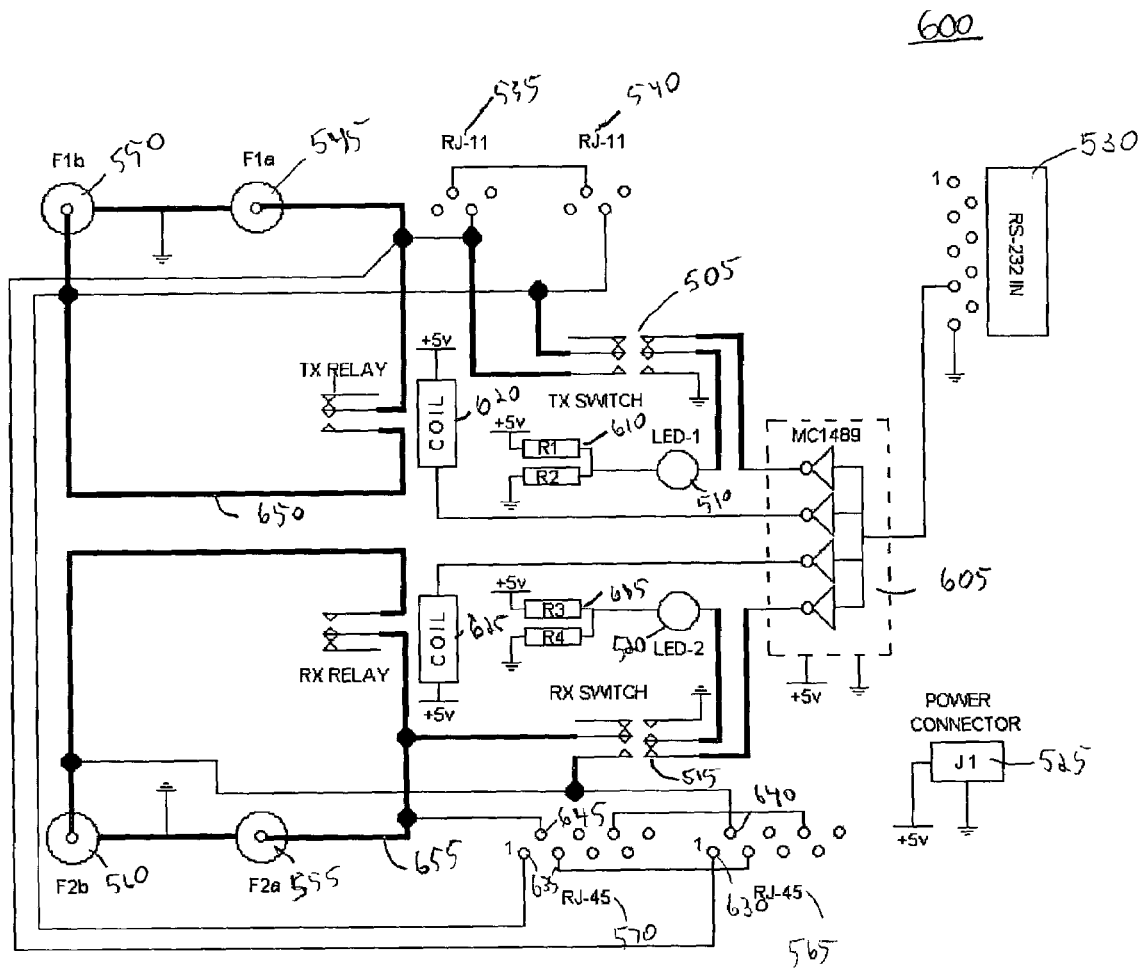
FIG. 6 is an exemplary circuit schematic of an interrupter device.

FIG. 6 shows a diagram 600 of a circuit that may be used to implement the interrupter device 115 of FIG. 5. The circuit diagram 600 identifies circuit components that correspond to the items enumerated in FIG. 5. In addition the circuit diagram includes a voltage converter chip 605, TX LED resistors 610, RX LED resistors 615, a TX relay coil 620, and a RX relay coil 625.

The DTR signal may be received using a connector, such as a serial connector 530 (e.g., a RS-232 connector 530 or universal serial bus (USB) connector). The DTR signal may be a two level voltage signal (e.g., approximately plus twelve volts when set to high and minus twelve volts when set to low). In the illustrated implementation, the relay coils 620 and 625 and LEDs 510 and 520 operate in a zero-to-five volt range. As a result, the received DTR signal may be processed by converting and inverting the 12 volt logic to a value of approximately zero volts when set to high and plus five volts when set to low. The voltage conversion/inversion may be performed using a voltage converter chip 605. The voltage converter chip 605 sends the processed DTR signal to the manual bypass switches 505 and 515 and the TX and RX relay coils 620 and 625.

In the automatic mode, the TX switch 505 and the RX switch 515 are set to AUTO and the processed DTR signal is directly connected to the LED 510 and the LED 520. When the DTR signal is set to high, the processed DTR signal is set to approximately zero volts and the LEDs 510 and 520 are energized (causing the LEDs to light up). Similarly, the TX relay coil 620 and the RX relay coil 625 also are energized when the processed DTR signal is set to approximately zero volts.

When energized, the TX relay coil 620 closes a circuit 650 between the TX input and output connectors and pins enabling the TX data communication paths between the computer 105 and the network 120. The TX input and output connectors and pins include: a TX Ethernet input pin 630 (included in connector 565), a TX Ethernet output pin 635 (included in connector 570), the phone line input connector 535, the phone line output connector 540, the satellite or cable TX input connector 545, and the satellite or cable TX output connector 550.

When energized, the RX relay coil 625 closes a circuit 655 between the RX input and output connectors and pins enabling the RX data communication paths between the computer 105 and the network 120. The RX input and output connectors and pins include: an RX Ethernet input pin 640 (included in connector 565), an RX Ethernet output pin 645 (included in connector 570), the satellite or cable RX input connector 555, and the satellite or cable RX output connector 560.

When the DTR signal drops to a low potential, the processed DTR signal from the voltage converter chip 605 rises to approximately five volts. The relay coils 620 and 625 (which are connected to the processed DTR signal) are no longer de-energized, and both the TX circuit 650 and the RX circuit 655 are broken. As a result, all of the data communication paths are disabled. In addition, because the processed DTR signal also is directly connected to the LEDs 510 and 520, the LEDs are not energized or illuminated. An alternative implementation may use LEDs that are always illuminated and that indicate that a circuit is broken by changing colors (e.g., change from green to red) when the DTR signal drops to a low potential.

In the bypass mode, one or both of the bypass switches 505 and 515 are set to ON. When the TX bypass switch 505 is set to ON, the circuit 650 connecting the TX input/output pins and connectors is closed. Therefore, the TX data communication paths are enabled regardless of the value of the DTR signal and regardless of whether the TX relay coil 620 is energized. As a result, the DTR signal is completely bypassed with respect to the TX data communication paths.

When the TX bypass switch 505 is set to ON, the TX LED 510 is connected to ground and energized using the TX LED resistors 610. As a result, the energized TX LED 510 lights to indicate that the TX data communication path is enabled.

Similarly, when the RX bypass switch 515 is set to ON, the circuit 655 including the RX input/output pins and connectors is closed. The RX data communication paths are enabled regardless of the value of the DTR signal. When the RX bypass switch 515 is set to ON, the RX LED 520 is connected to ground and energized using the RX LED resistors 615. As a result, the energized RX LED 515 lights to indicate that the RX data communication path is enabled.

When both bypass switches 505 and 515 are set to ON, both the RX and TX communication paths are enabled regardless of the value of the DTR signal. The LEDs 510 and 520 are both energized and illuminated to indicate that the TX and RX communication paths are enabled.

In the manual mode, the interrupter device 115 may be disconnected from the computer 105 so that no DTR signal is received at the serial input connector 530. The interrupter device 115 also may be operated in the manual mode while connected to the computer 105 provided that the DTR signal is disabled (e.g., remains at a low voltage). The power connector 525 of the interrupter device 115 also may be disconnected from the external power source when operating in the manual mode.

In the manual mode, the manual bypass switches 505 and 515 are used to enable and disable the communication paths directly. When the TX bypass switch 505 is set to ON, the circuit 650 including the TX input/output pins and connectors is closed, and the TX data communication paths are enabled. When the TX bypass switch 505 is set to AUTO, the circuit 650 is broken, and the TX data communication paths are disabled. Similarly, when the RX bypass switch 515 is set to ON, the circuit 655 including the RX input/output pins and connectors is closed, and the RX data communication paths are enabled. When the RX bypass switch 515 is set to AUTO, the circuit 655 is broken, and the RX communication paths are disabled.

In another implementation, each input/output pin and connector may be connected to a counterpart using a separate communication circuit (i.e., communication path). Each communication circuit may include a separate coil relay and bypass switch. Separating the communication circuits used for each type of data communication connection eliminates the restriction of certain types of connections described above for the manual mode.

In another implementation, the TX and RX data communication paths may be enabled and disabled by a separate TX DTR signal and RX DTR signal. Each DTR signal is received using a separate pin of the serial input connector 530. The TX DTR pin is connected to the TX bypass switch 505 and the TX Relay coil 620. The RX DTR pin is connected to the RX bypass switch 515 and the RX relay coil 625.

The computer 105 may generate the DTR output signal using an automation software package (e.g., Segue's QA Partner) that is programmed to send out a DTR signal (e.g., if a timer of the computer 105 is used) or timing signal (e.g., if the timing processor 200 is used) using a COM port of the computer 105. The automation software may execute a script that includes commands that are executed by the computer 105. These commands may include, for example, initializing the DTR signal to high, launching client software to connect to the network 120, signing onto the network, browsing the world-wide-web, downloading files or graphics from the network 120, sending a low DTR signal after a specified amount of time or after a specified step in the script, and signing off from the network 120.

The automation software may operate as a batch file and repeat diagnostic tests of programs as necessary. The timing of the interruptions can be further controlled precisely using a script or other automation software to enable interruption of the RX, the TX, or the RX and the TX data communication paths at a time relative to a specific step of the program running on the computer 105 (e.g., when the step begins or a specific time after execution of the step) or at an absolute time that is not dependent on any steps of the program. The automation software may use a small memory footprint and a small number of processor clock cycles to minimize the load on the processor of the computer 105, which, in turn, helps to provide accurate interrupt times.

FIG. 7 shows an example of a script 700 that may be used with an automation software program. When the automation software program is started, "Test" is displayed in the title bar of the program's display (700). A browser cache of the computer 105 and the interrupter device 115 is cleared (705). The "dtr_init" command initializes the connection between the computer 105 and the interrupter device 115 using the COM port 1 of the computer 105 (710). The program may wait for a period of time (e.g., ten seconds) to ensure completion of the initialization of COM port 1 (715). The interrupter device 115 may then be turned on and set to the automatic mode.

Once the interrupter device 115 is turned on and set to the automatic mode, the system 100 initializes the connection between the network 120, the interrupter device 115, and the network interface device 110 by sending a high voltage level DTR signal (i.e., dtr_raise) to the interrupter device 115 (720). When the high DTR signal is received by the interrupter device 115, a connection between the network interface device 110 and the network 120 is established. At this point, the system 100 may wait, for example, until the network interface device 110 is initialized and able to exchange data with the network 120 (725).

The time required to initialize the connection between the network 120 and the network interface device 110 is dependent on the type of network interface device 110 used. For example, phone line connection may take approximately five seconds to initialize, while a broadband cable connection may take approximately one and a half minutes to initialize. In this example, the system 100 waits five seconds for initialization (725), and then executes a "start client" command (730) that is used to launch the client software that serves as a software interface between the computer 105 and the network 120.

After another five seconds (735), the system 100 signs onto the network 120 using the software interface, for example, by sending a password to a device in the network 120 (740-750). After a predetermined wait time (e.g., 20 secs) to ensure that signing onto the network is successful (755), all open windows of applications compatible with the automation software program are closed by the "close all" command (760).

The command "dtr_timer" may be executed to force the DTR signal to go low and interrupt communications (765). For example, the command "dtr_timer 15000" may be used to interrupt communications after fifteen seconds. The system 100 then starts downloading a web page from the Internet (770, 775). In this example, fifteen seconds is chosen specifically to expire while a web page is being rendered. The "dtr_timer" command has priority over the web page downloading command because the "dtr_timer" command is issued first, and, therefore, interrupts the downloading of the web page midstream. As a result, the response of the client software to an abnormal disconnect may be tested.

The thirty second wait (780), the "sign off" command (785), the fifteen second wait (790), and the "dtr_close" command (795) are included for completion of the script and, absent the "dtr_timer" command that interrupts communications after 15 seconds, would sign-off and disconnect the network interface device 110 from the network 120.

Figure 8:
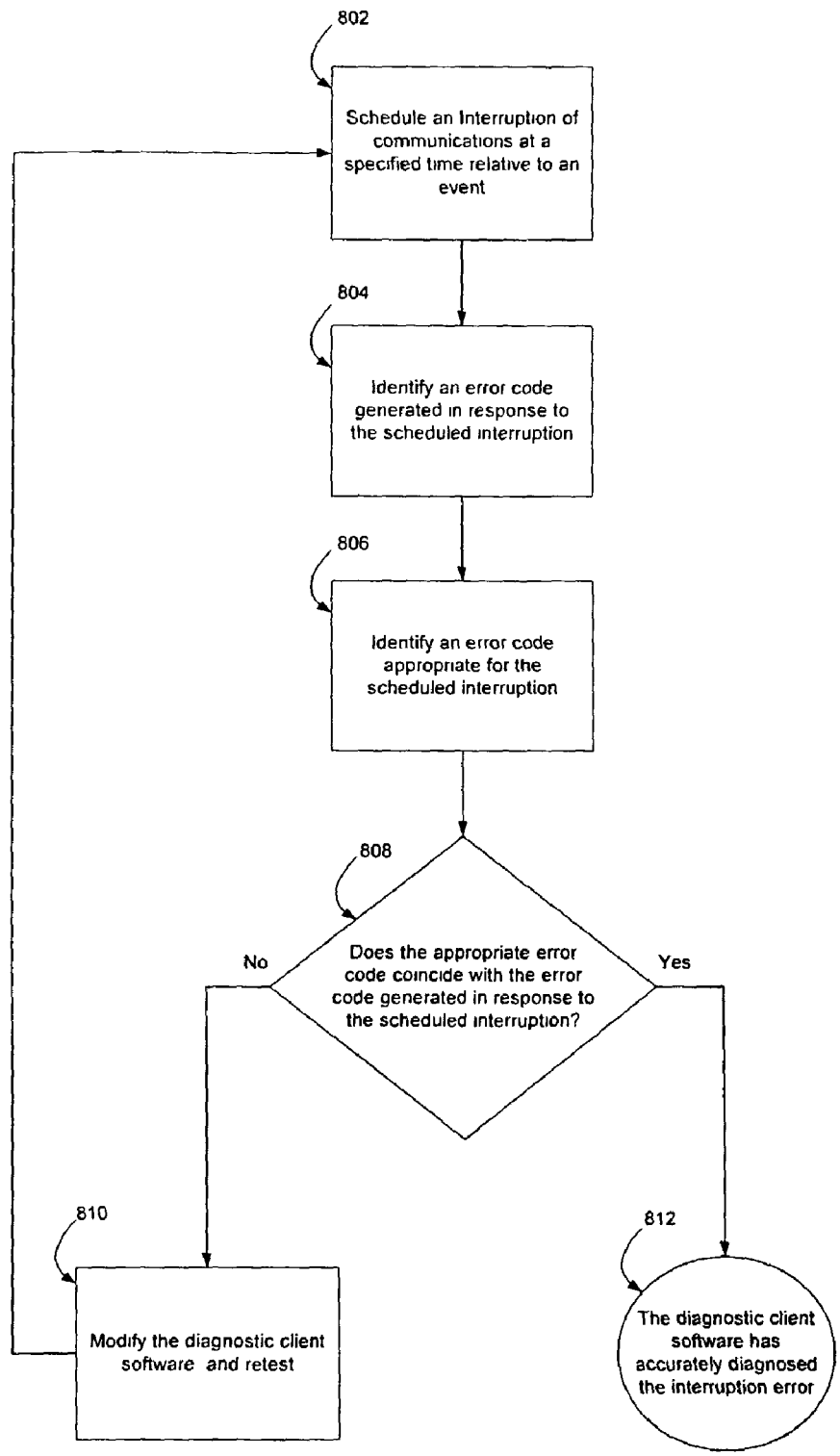
FIG. 8 is a block diagram of a process to test and develop client software program.

When testing client program software, a user may use the communications systems described above to force an interruption of communications at a specific time relative to an event. FIG. 8 shows an example of a method 800 that may be used in a software development system to test and develop client program software. Initially, the software development system configures the interrupter communications system to instruct an interruption at a specified time relative to an event (step 802).

After communications have been interrupted, the client diagnostic software reacts to the interrupted communication by selecting an error code based on the timing of the interruption (step 804). The error code may be selected, for example, from a library of possible disconnect errors. Meanwhile, the software development system determines or recalls the actual time of the interrupt from the computer and/or interrupter device, and uses the actual time of the interrupt to identify an error code appropriate for the timing of the interrupt from the library of possible disconnect errors (step 806).

The error code selected by the client diagnostic software then is compared to the appropriate error code (step 808). If the error code selected by the client diagnostic software differs from the appropriate error code, the client diagnostic software may be analyzed and/or modified to more accurately diagnose interruptions in the future (step 810). If the error code selected by the client diagnostic software is the appropriate error code, further development of the software at least with respect to the portion of the software code being tested may not be necessary (step 812).

The communications systems described above provide both the flexibility and the scalability necessary for development of client diagnostic software that is able to properly diagnose among the significant number of possible disconnect errors. Specifically, the described communications systems provide the flexibility to create a communications interruption at a time relative to a process executed by the client software, unlike manual systems which limit interruptions to an absolute time. The described communications systems also provide the flexibility to create interruptions without using the processing cycles of the computer that is interrupted. This enhances the accuracy of the timing of the interruptions by preventing the execution of the client software program from being interfered with by the test. Additionally, the described communications systems provide scalability through the ability to automate and repeat communication interruptions. Because of the greater timing control provided by the interrupter device, as described in the various implementations discussed above, the effect of the communications interruptions on programs can be diagnosed with greater accuracy.

A number of implementations have been described. Nevertheless, it will be understood that various modifications may be made. For example, advantageous results may be achieved if steps of the disclosed techniques are performed in a different order and/or if components in the disclosed systems are combined in a different manner and/or replaced or supplemented by other components. Other types of signals may take the place of the DTR and timing signals. For example, an instruction rather than a binary signal may be sent to the interrupter device and/or timing processor. The instruction may include the timing of the scheduled interruption and may be interpreted or decoded by the interrupter device and/or the timing processor.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Accordingly, other implementations are within the scope of the following claims.

What is claimed is:

1. An apparatus to invoke an intended interruption of communications, the apparatus comprising:
   a first communications port that enables communications with a first computer;
   a second communications port that enables communications with a second computer;
   a communications path between the first communications port and the second communications port;
   a third communications port that enables receipt of a control signal;
   circuitry that disables the communications path based on a value of the control signal, the disabling of the communications path severing previously established communications between the first and the second computers over the communications path; and
   a processor configured to determine the accuracy of an error code generated by a communications program in response to the disabling of the communications path, the communications program being configured to enable use or establishment of the communications path.

2. The apparatus of claim 1 wherein the circuitry is configured to enable the communications path based on the value of the control signal.

3. The apparatus of claim 1 further comprising a timing processor that generates the control signal and provides the control signal to the third communications port.

4. The apparatus of claim 3 wherein the timing processor is configured to receive a timing signal and to generate the control signal based on the timing signal.

5. The apparatus of claim 4 wherein the timing processor is configured to receive the timing signal as an interruption request from a third computer, the interruption request being based on communications involving a program that uses or establishes the communications path.

6. The apparatus of claim 5, wherein the third computer comprises the first computer.

7. The apparatus of claim 5, wherein the third computer and the first computer are distinct.

8. The apparatus of claim 4 wherein the interruption request instructs interruption at a predetermined time relative to a communication event involving the program.

9. The apparatus of claim 4 wherein the interruption request includes a start time and a stop time.

10. The apparatus of claim 9 wherein:
    the timing processor presents a manual user interface to enable input of a start time and a stop time, and
    the timing processor is configured to generate the control signal based on the start time and the stop time.

11. The apparatus of claim 1 further comprising a fourth communications port configured to enable communications of timing data to the first computer to relate timing information with respect to when the communications path is enabled or disabled.

12. The apparatus of claim 1 wherein the device includes manual switches to manually enable or disable the communications path.

13. The apparatus of claim 1 wherein the communications path includes a receive communications path from the second communications port to the first communications port that is disabled based on the value of the control signal.

14. The apparatus of claim 1 wherein the communications path includes a transmit communications path from the first communications port to the second communications port that is disabled based on the value of the control signal.

15. The apparatus of claim 1 wherein the third communications port and the first communications port are a single physical port.

16. The apparatus of claim 1 wherein the third communications port and the first communications port are physically distinct ports.

17. The apparatus of claim 1 wherein the first computer is configured to communicate or establish communications with the second computer using the communications program.

18. The apparatus of claim 1 wherein the processor is further configured to receive timing information associated with the disabling of the communications path.

19. The apparatus of claim 18 wherein the timing information includes data indicating the time at which the disabling of the communications path occurred.

20. The apparatus of claim 18 wherein the processor is further configured to identify a predicted error code based on the timing information, the predicted error code being indicative of an error code predicted to be generated by the communications program in response to the disabling of the communications path.

21. The apparatus of claim 20 wherein the processor is further configured to:
    access the generated error code, and
    determine the accuracy of the generated error code based on a comparison of the generated error code with the predicted error code.

22. The apparatus of claim 1, wherein the communications program is executed by the first computer to transmit and receive signals over the communications path, the first computer is configured to generate the control signal at a time when a specific process is being performed by the communications program, and the processor is configured to determine the accuracy of an error code generated by the communications program in response to an interruption in the specific process, the interruption being caused by the disabling of the communications path.

23. The apparatus of claim 22, wherein the processor is configured to determine the accuracy of an error code generated by the communications program in response to an interruption in downloading data from a remote server.

24. The apparatus of claim 23, wherein the processor is configured to determine the accuracy of an error code generated by the communications program in response to an interruption in downloading a web page from a web server or in downloading e-mail data from an e-mail server.

25. The apparatus of claim 22, wherein the processor is configured to determine the accuracy of an error code generated by the communications program in response to an interruption in uploading data to a remote server.

26. The apparatus of claim 25, wherein the processor is configured to determine the accuracy of an error code generated by the communications program in response to an interruption in uploading password data to a remote computer system or uploading e-mail data to an e-mail server.

27. The apparatus of claim 1 wherein the communications path includes a receive communications path between the second communications port and the first communications port, and a transmit communications path between the second communications port and the first communications port, and the circuitry that disables the communications path based on the value of the control signal disables the receive communications path and does not disable the transmit communications path.

28. The apparatus of claim 1 wherein the communications path includes a receive communications path between the second communications port and the first communications port, and a transmit communications path between the second communications port and the first communications port, and the circuitry that disables the communications path based on the value of the control signal disables the transmit communications path and does not disable the receive communications path.

29. The apparatus of claim 1 wherein the communications path includes a receive communications path between the second communications port and the first communications port, and a transmit communications path between the second communications port and the first communications port, and the circuitry that disables the communications path based on the value of the control signal disables both the transmit communications path and the receive communications path.

30. A system to enable detection of a response of a communications system to timed interruption of communications, the system comprising:
    at least one communications path;
    a control signal that instructs an intended interruption in previously established communications between a first computer and a second computer over the communications path;
    a third computer; and
    a device that disables the communications path based on a control signal communicated by the third computer, wherein the third computer is configured to determine the accuracy of an error code generated by a communications program in response to the disabling of the communications path, the communications program being configured to enable use or establishment of the communications path.

31. The system of claim 30 wherein the device is configured to enable the communications path based on the control signal.

32. The system of claim 30 wherein the third computer is configured to generate the control signal.

33. The system of claim 32 wherein the third computer is configured to generate the control signal that instructs the intended interruption at a time predetermined by a user of the third computer.

34. The system of claim 30 further comprising a timing processor configured to generate the control signal.

35. The system of claim 34 wherein the timing processor is configured to:
    receive an interruption request that requests the intended interruption, and
    generate the control signal based on the interruption request.

36. The system of claim 35 wherein the third computer comprises the first computer and the interruption request is received from the third computer and is based on communications involving a program that uses or establishes the communications path.

37. The system of claim 35 wherein the interruption request instructs interruption at a predetermined time relative to a communication event involving the program.

38. The system of claim 30 further comprising a program to transmit and to receive signals on the communications path wherein the third computer comprises the first computer and is configured to generate the control signal based on the processing activities of the program.

39. The system of claim 38 wherein the program includes diagnostic software used to determine if a communications interruption is diagnosed correctly.

40. The system of claim 30 wherein the device includes manual switches to manually enable or disable at least one communications path.

41. The system of claim 30 wherein at least one of the communications paths includes a receive communications path that is disabled based on the control signal.

42. The system of claim 30 wherein at least one of the communications paths includes a transmit communications path that is disabled based on the control signal.

43. The system of claim 30 wherein the third computer is configured to detect a disabled communications path and to generate an error code based on the detected disabled communications path.

44. The system of claim 43 wherein the third computer is configured to determine whether the error code generated is correct based on the control signal.

45. The system of claim 30 wherein the second computer is configured to generate the control signal.

46. The system of claim 45 wherein the second computer generates the control signal that instructs the intended interruption at a time predetermined by a user of the second computer.

47. The system of claim 45 wherein the second computer generates the control signal based on communications involving a program that uses or establishes the communications path.

48. The system of claim 30 wherein the third computer is configured to determine if a communications interruption is diagnosed properly.

49. The system of claim 30 wherein the previously established communications between the first and second computers occur over the communications path and over at least one of a local area network, a wide area network, and a metropolitan area network.

50. The system of claim 30 wherein the previously established communications between the first and second computers occur over the communications path and over at least one of a local area network, a wide area network, and a metropolitan area network.

51. The system of claim 30 wherein the third computer comprises the first computer.

52. The system of claim 30 wherein the first computer, the second computer, and the third computer are different computers.

53. The system of claim 30 wherein the third computer is configured to determine the accuracy of an error code generated by a communications program in response to the disabling of the communications path, the communications program being configured to enable use or establishment of the communications path.

54. The system of claim 53 wherein the first computer is configured to communicate or establish communications with the second computer using the communications program.

55. The system of claim 53 wherein the third computer is further configured to receive timing information associated with the disabling of the communications path.

56. The system of claim 55 wherein the timing information includes data indicating the time at which the disabling of the communications path occurred.

57. The system of claim 55 wherein the third computer is further configured to identify a predicted error code based on the timing information, the predicted error code being indicative of an error code predicted to be generated by the communications program in response to the disabling of the communications path.

58. The system of claim 57 wherein the third computer is further configured to:
access the generated error code, and
determine the accuracy of the generated error code based on a comparison of the generated error code with the predicted error code.

59. The system of claim 30, further comprising a network interface device configured to handle the exchange of communications data between the first computer and a network, the communications path extending over the network.

60. The system of claim 59, wherein the device is positioned between the network interface device and the network.

61. The system of claim 59, wherein the device is positioned between the first computer and the network interface device.

62. The system of claim 59, further comprising the first computer.

63. The system of claim 62, wherein the device and the network interface device are internal to the first computer.

64. The system of claim 62, wherein the network interface device is internal to the first computer and the device is external to the first computer.

65. The system of claim 30 wherein the at least one communications path includes a receive communications path between the first computer and the second computer, and a transmit communications path between the first computer and the second computer, and the device that disables the at least one communications path based on the control signal disables the receive communications path and does not disable the transmit communications path.

66. The system of claim 30 wherein the at least one communications path includes a receive communications path between the first computer and the second computer, and a transmit communications path between the first computer and the second computer, and the device that disables the at least one communications path based on the control signal disables the transmit communications path and does not disable the receive communications path.

67. The system of claim 30 wherein the at least one communications path includes a receive communications path between the first computer and the second computer, and a transmit communications path between the first computer and the second computer, and the device that disables the at least one communications path based on the control signal disables both the transmit communications path and the receive communications path.

68. A method to enable detection of a potential response to an interruption of communications, the method comprising:
instructing an intended and scheduled interruption of communications in advance of the scheduled interruption;
determining an error code appropriate for the scheduled interruption;

identifying an error code generated in response to the scheduled interruption; and determining whether the generated error code is accurate based on a comparison of the generated error code and the determined error code.

69. The method of claim 68 wherein determining an error code appropriate for the scheduled interruption includes identifying the error code from a library of possible error codes based on the actual timing of the scheduled interruption.

70. The method of claim 68 wherein identifying an error code generated in response to the scheduled interruption includes identifying an error code generated by a diagnostic client software program in response to the scheduled interruption.

71. A system for testing the accuracy of an error response by a communications device to an interruption in communications, the system comprising:

a first communications device;

a second communications device configured to:
communicate with the first communications device over a communications path, and
respond to an interruption in communications over the communications path by generating an error code; and an interruption device configured to enable testing of the accuracy of an error response by the second communications device by:
creating an interruption to previously established communications between the first communications device and the second communications device over the communications path to simulate a communications error, and
enabling comparison of an error code known to correspond to the simulated error with an error code generated by the second communications device in response to the interruption.

72. The apparatus of claim 71 wherein the previously established communications between the first and second communications devices occur over the communications path and over at least one of a local area network, a wide area network, and a metropolitan area network.

73. The system of claim 71 wherein the interruption device is configured to interrupt previously established communications in response to a control signal received from a third communications device that is different from the first and different from the second communication devices.

74. The system of claim 73 wherein the third communications device comprises a computer.

75. The system of claim 71 wherein the interruption device is configured to interrupt previously established communications in response to a control signal received from the first communications device or from the second communications device.

76. The system of claim 71 wherein the interruption device is configured to interrupt the previously established communications in response to a switching of a manual switch.

77. The system of claim 71 wherein the first communications device comprises a computer.

78. The system of claim 71 wherein the interruption device is configured to interrupt the previously established communications at a predetermined scheduled time.

79. The system of claim 78 wherein the interruption device is configured to enable comparison of an error code known to correspond to the simulated error with an error code generated by the second communications device by interrupting the previously established communications at the predetermined scheduled time.

80. The system of claim 78 wherein the predetermined scheduled time comprises a time known at a time prior to the interruption to correspond to the simulated error.

81. The system of claim 78 wherein the predetermined scheduled time comprises a predetermined absolute time.

82. The system of claim 78 wherein the predetermined scheduled time comprises a predetermined relative time.

83. The system of claim 82 wherein the relative time comprises a predetermined time relative to a time at which a communication event occurs involving a communications program that enables use or establishment of the communications path.

84. The system of claim 71 wherein the interruption device is configured to interrupt the previously established communications at a start time and further configured to reestablish communications between the first and the second communications devices over the communications path at a stop time subsequent to the start time.

* * * * *